United States Patent
Kim et al.

(10) Patent No.: US 6,175,390 B1
(45) Date of Patent: *Jan. 16, 2001

(54) MODULE TV AND CONTROL METHOD THEREOF

(75) Inventors: Bok Kie Kim, Daeku; Woon Gil Baek, Kumi, both of (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/997,468

(22) Filed: Dec. 23, 1997

(30) Foreign Application Priority Data

Dec. 23, 1996 (KR) .................................... 96/70746

(51) Int. Cl.$^7$ ...................................................... H04N 5/44
(52) U.S. Cl. ............................................ 348/725; 348/553
(58) Field of Search ..................................... 348/553, 554, 348/725, 180, 189, 190, 839; 395/651, 653, 284, 282, 836

(56) References Cited

U.S. PATENT DOCUMENTS

| | | | |
|---|---|---|---|
| 3,708,618 | * 1/1973 | Hofmeister et al. | 348/839 |
| 4,759,123 | * 7/1988 | Ohta et al. . | |
| 4,969,046 | * 11/1990 | Sugimoto et al. | 348/839 |
| 5,245,429 | * 9/1993 | Virginio et al. | 358/142 |
| 5,263,148 | * 11/1993 | Jones, Jr. et al. | 395/500 |
| 5,315,391 | * 5/1994 | Lee | 348/553 |
| 5,579,487 | * 11/1996 | Meyerson et al. | 395/280 |
| 5,675,748 | * 10/1997 | Ross | 395/284 |
| 5,703,657 | * 12/1997 | Maruoka et al. | 348/554 |
| 5,703,658 | * 12/1997 | Tsuru et al. | 348/554 |
| 5,713,009 | * 1/1998 | DeRosa, Jr. et al. | 395/500 |
| 5,740,436 | * 4/1998 | Davis et al. | 395/651 |
| 5,790,189 | * 8/1998 | Moon | 348/189 |
| 5,815,080 | * 9/1998 | Taguchi | 340/635 |
| 5,823,871 | * 10/1998 | Shiau | 463/1 |
| 5,835,864 | * 11/1998 | Diehl et al. | 455/6.2 |
| 5,949,497 | * 9/1999 | Baek | 348/725 |

OTHER PUBLICATIONS

Clark "A Telecomputer", Computer Graphics, Jul. 1992, pp. 19–23.*

* cited by examiner

*Primary Examiner*—Thomas G. Black
*Assistant Examiner*—Uyen Le
(74) *Attorney, Agent, or Firm*—Finnegan, Henderson, Farabow, Garrett & Dunner, L.L.P.

(57) ABSTRACT

A module TV and control method thereof selects a module type requested by a customer at an initial stage during the module TV production, and enables a variety of module TVs to respectively have a plurality of functions in accordance therewith. The module TV includes a key control unit for acknowledging a key signal serving to control the module TV, a microcomputer for controlling function cards mounted in the module TV and determining whether the function cards are mounted in the module TV, a connection unit for connecting the microcomputer and the function cards, and a memory connected to the microcomputer and for storing therein functional states of the function cards.

4 Claims, 12 Drawing Sheets

A

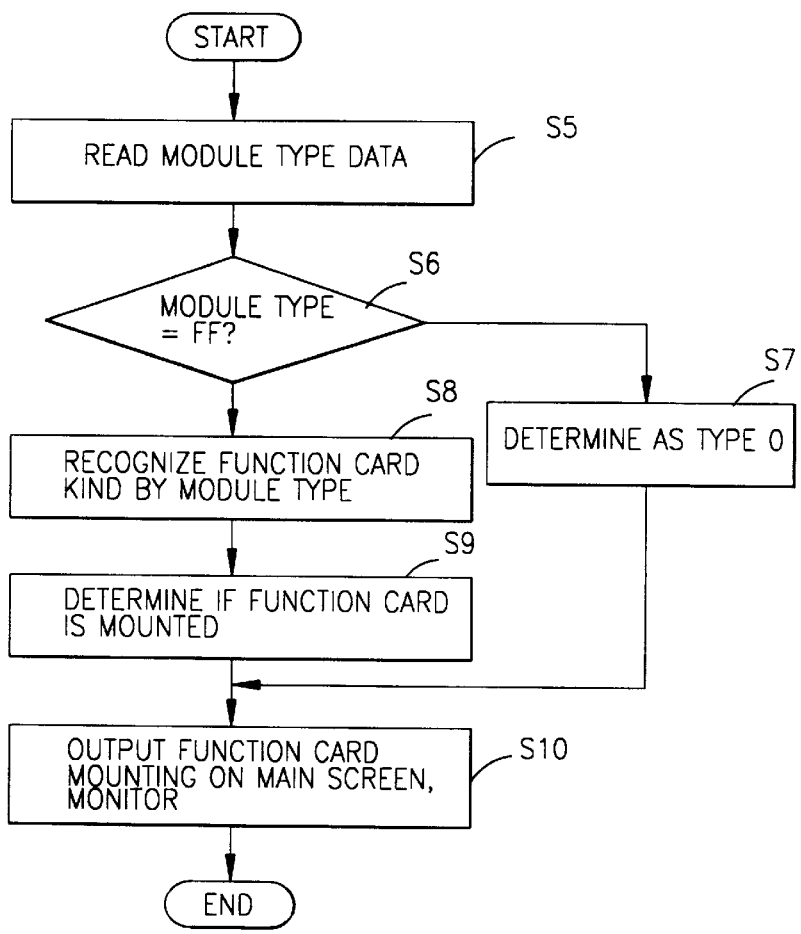

FIG. 9

| MODULE TYPE | KINDS OF FUNCTION CARD MOUNTED | REMARKS |
|---|---|---|
| TYPE O | SIGNAL SWITCHING CARD(17)+ VIDEO CONTROL CARD(18)+ AUDIO CONTROL CARD(19) | MONITOR EXCLUSIVE TV |
| TYPE A | MAIN SCREEN TUNER CARD(12) +SIGNAL SWITCHING CARD(17) +VIDEO CONTROL CARD(18) +AUDIO CONTROL CARD(19) | SIMPLE FUNCTION TV |
| TYPE B | SUB-SCREEN TUNER CARD(13) +GHOST REMOVE CARD(14) +SIGNAL SWITCHING CARD(17) +VIDEO CONTROL CARD(18) +AUDIO CONTROL CARD(19) | GHOST REMOVE(GCR) FUNCTION TV |
| TYPE C | MAIN SCREEN TUNER CARD(12) +SUB-SCREEN TUNER CARD(13) +GHOSTER REMOVE CARD(14) +PIP CARD(16) +SIGNAL SWITCHING CARD(17) +VIDEO CONTROL CARD(18) +AUDIO CONTROL CARD(19) | PIP GHOST REMOVE FUNCTION TV |
| TYPE D | MAIN SCREEN TUNER CARD(12) +SUB-SCREEN TUNER CARD(13) +MULTIVOICE CARD(15) +PIP CARD(16) +SIGNAL SWITCHING CARD(17) +VIDEO CONTROL CARD(18) +AUDIO CONTROL CARD(19) | PIP & MULTIVOICE FUNCTION TV |

| FUNCTION CARD | SLAVE ADDRESS |
|---|---|
| MAIN SCREEN TUNER CARD(12) | 10(hex) |
| SUB-SCREEN TUNER CARD(13) | 20(hex) |
| GHOSTER REMOVE CARD(14) | 30(hex) |
| MULTIVOICE CARD(15) | 40(hex) |
| PIP CARD(16) | 50(hex) |
| SIGNAL SWITCHING CARD(17) | 60(hex) |
| VIDEO CONTROL CARD(18) | 70(hex) |
| AUDIO CONTROL CARD(19) | 80(hex) |

FIG. 13

| MODULE TYPE : TYPE C | |
|---|---|
| KINDS OF CARD | STATE |
| MAIN SCREEN TUNER CARD | NORMAL |
| SUB-SCREER TUNER CARD | NORMAL |
| GHOST REMOVE CARD | NORMAL |
| PIP CARD | CHECK NEEDED |
| SIGNAL SWITCHING CARD | NORMAL |
| VIDEO CONTROL CARD | NORMAL |
| AVDIO CONTROL CARD | CHECK NEEDED |

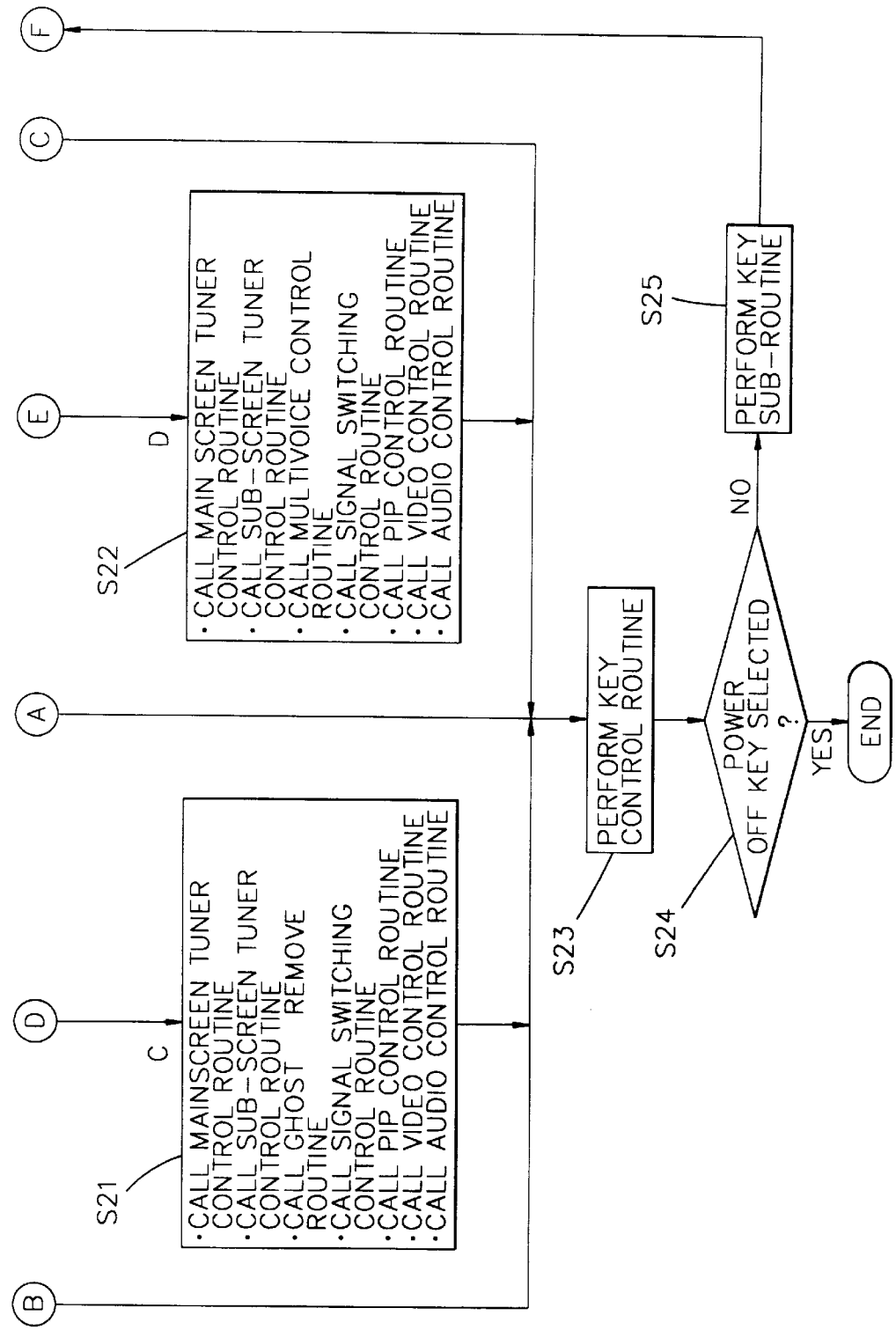

MODULE TV AND CONTROL METHOD THEREOF

BACKGROUND OF THE INVENTION

1. Field of the Invention

The present invention relates to a module TV, and more particularly to an improved module TV and control method thereof which effectively corresponds to a customized module TV by selecting a module type requested by a customer at an initial step of its production.

2. Description of the Background Art

As shown in FIG. 1, a general module TV includes: a key input unit 1, a tuner card 2 for receiving a broadcast signal; a PIP (Video-In-Video) card 3 for PIP-processing the broadcast signal received from the tuner card 2; a microcomputer 4 for carrying out a general control operation of the module TV; a switching unit 5 for switching an external video signal and the broadcast signal outputted from the tuner card 2; a video/audio processing unit 6 for processing an external video sign or a broadcast signal received from the switching unit 5; and card connection units 7~10 for electrically connecting the tuner card 2 and the PIP card 3 to an internal circuit provided in the module TV.

The tuner card 2 includes: a tuner 2-1 for selecting a broadcast signal of a desired channel; an IF (Intermediate Frequency) processing unit 2-2 for converting the broadcast signal of the selected channel to an IF signal and then branching the converted IF signal to a video signal VS1 and an audio signal AS1; and an audio processing unit 2-3 for processing an audio signal AS1 outputted from the IF processing unit 2-2. Here, the PIP card 3 is provided with a color demodulator 3-1 and a PIP processing unit 3-2.

The switching unit 5 includes: a first switch 5-1 for switching an externally applied video signal VS2 and a video signal VS1 outputted from the IF processing unit 2-2 under the control of the microcomputer 4; and a second switch 5-2 for switching an externally applied audio signal AS2 and an audio signal AS2 outputted from the audio processing unit 2-3.

The video/audio processing unit 6 includes: an audio control unit 6-1 and an amplifier 6-2 for processing and outputting to a speaker 6-3 the audio signal AS1 or AS2 outputted from the second switch 5-2; and a chroma unit 6-4 and a deflection unit 6-5 for processing the video signal VS1 or VS2 outputted from the first switch 5-1 and displaying the precessed signal on the color receiving tube 6-6. The operation of the thusly constituted conventional module TV will now be described with reference to the accompanying drawings.

First, the microcomputer 4 carries out a step for recognizing cards if they are mounted in the module TV.

That is, the microcomputer 4 resets a builtin error counter (not shown), outputs through output terminals OUT1, OUT2 and an option terminal P low level signals which are equivalent to those in FIGS. 2A through 2C, and reads, at point A, signals applied from the key input unit 1 to the input terminals IN1~IN4.

Then, the microcomputer 4 compares levels of the signals between at the input terminals IN1~IN4 and at the option terminal P. At this time, when the two signal levels are different from each other, the signals at the input terminal is recognized as one at the option terminal P and then the above step is once again carried out; when the two signal levels are equal, a counter value in the builtin error counter (not shown) is increased by "1".

Thereafter, the microcomputer carries out such a card acknowledgement step several times, and when the counter value in the error counter (not shown) becomes "10", it is determined whether there are cards and which kinds of cards they are, in accordance with signal levels of the input terminals IN1~IN4.

In other words, when the microcomputer 4 outputs a low level signal to the option terminal P in order to determine whether cards are mounted, assuming that the tuner card 2 is mounted in the card connection unit 7, a diode D1 of the tuner card 2 is turned on by the low level signal of the option terminal P.

Subsequently, current i flows from the input terminal IN1 towards the output terminals OUT1, OUT2, whereby the signal at the input terminal IN1 is recognized as a low level, whereas the signals at the input terminals IN~IN4 without cards mounted therein are recognized as high levels. At this time, the above acknowledgement is similarly applied to a case in which the PIP card is mounted in the card connection unit 10 or a card is mounted in the card connection units 8–9.

Therefore, the moment when the counter value in the error counter (not shown) becomes "10", the microcomputer 4 determines that when the signals at the input terminals IN~IN4 are at low levels there are mounted cards and when the signals at the input terminals IN~IN4 are at high levels there are not mounted cards.

When the card acknowledgement step is completed, the microcomputer 4 carries out a control operation according to the kinds of the recognized cards.

Firstly, when neither of the tuner card 2 and the PIP card 3 is mounted, the microcomputer 4 controls the first and second switches 5-1, 5-2 of the switching unit 5, whereby externally applied video signal VS2 and audio signal AS2 may be inputted to the video/audio processing unit 6.

Secondly, when only the tuner card 2 is mounted, the microcomputer 4 controls the first and second switches 5-1, 5-2 in the switching unit 5 are controlled, whereby the video signal VS1 and the audio signal AS1 outputted from the tuner card 2 may be inputted to the video/audio processing unit 6.

Thirdly, when both the tuner card 2 and the PIP card 3 are mounted, the microcomputer 4 controls the first and second switches 5-1, 5-2 in the switching unit 5, whereby the video signal VS1 and the audio signal AS1 outputted from the tuner card 2 and the video signal VS3 PIP-processed in the PIP card 3 may be inputted to the video/audio processing unit 6.

Fourthly, when the PIP card 3 is mounted, the microcomputer 4 controls the first and second switches 5-1, 5-2 in the switching unit 5, whereby the externally applied video signal VS2, audio signal AS2 and the video signal VS3 PIP-processed in the PIP card 3 may be inputted to the video/audio processing unit 6.

Thereafter, the audio signal (AS1 or AS2) inputted to the video/audio processing unit 6 becomes regenerated at the speaker 6-3 through the audio control unit 6-1 and the amplifier 6-2, and the video signals VS2, VS3 are inputted to the color receiving tube 6-6 through the chroma unit 6-4. The color receiving tube 6-6 displays the video signals together with the PIP screen under the control of the deflection unit 6-5.

However, the conventional module TV employs diodes at respective function cards so that two connection lines per function card are required to electrically connect an TV interior with the respective card in addition to the control line.

As a result, in order to increase function cards in number, the equivalent number of connection lines should disadvantageously be increased, whereby not only should mountable function card number be limited but respective locations for recognizing relevant function cards should also be fixed, thereby increasing a design burden.

SUMMARY OF THE INVENTION

Accordingly, it is an object of the present invention to provide a module TV and control method thereof which is capable of effectively corresponding to a customized module TV as well as improving a design efficiency by jointly using two connection lines without respect to the number of function modules.

To achieve the above-described object, there is provided a module TV according to the present invention which includes a key control unit for acknowledging a key signal serving to control the module TV, a microcomputer for controlling function cards mounted in the module TV and determining whether the function cards are mounted in the module TV, a connection unit for connecting the microcomputer and the function cards, and a memory connected to the microcomputer and for storing therein functional states of the function cards.

Further, to achieve the above-described object, there is provided a module TV control method according to the present invention which includes a first step for storing data with regard to a module type through an external control device connected to an $I^2C$ bus, a second step for determining a module type by reading the stored module data, and checking whether function cards required for the determined module type are mounted, a third step for reading the stored data with regard to the module types and determining module types, when the function cards are all mounted, and a fourth step for carrying out control routines with regard to the function cards in accordance with the determined module type.

The object and advantages of the present invention will become more readily apparent from the detailed description given hereinafter. However, it should be understood that the detailed description and specific example, while indicating a preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein:

FIG. 7 is a flow chart illustrating a module type and a function card acknowledgement process according to the present invention;

FIG. 8 is a table illustrating module data being stored in a memory according to the present invention;

FIG. 9 is a table illustrating kinds of function cards being mounted in respective module types according to the present invention;

FIG. 13 is a table illustrating mounting states of function cards being mounted in a particular module type according to the present invention.

DETAILED DESCRIPTION OF THE PREFERRED EMBODIMENTS

Figure 1:
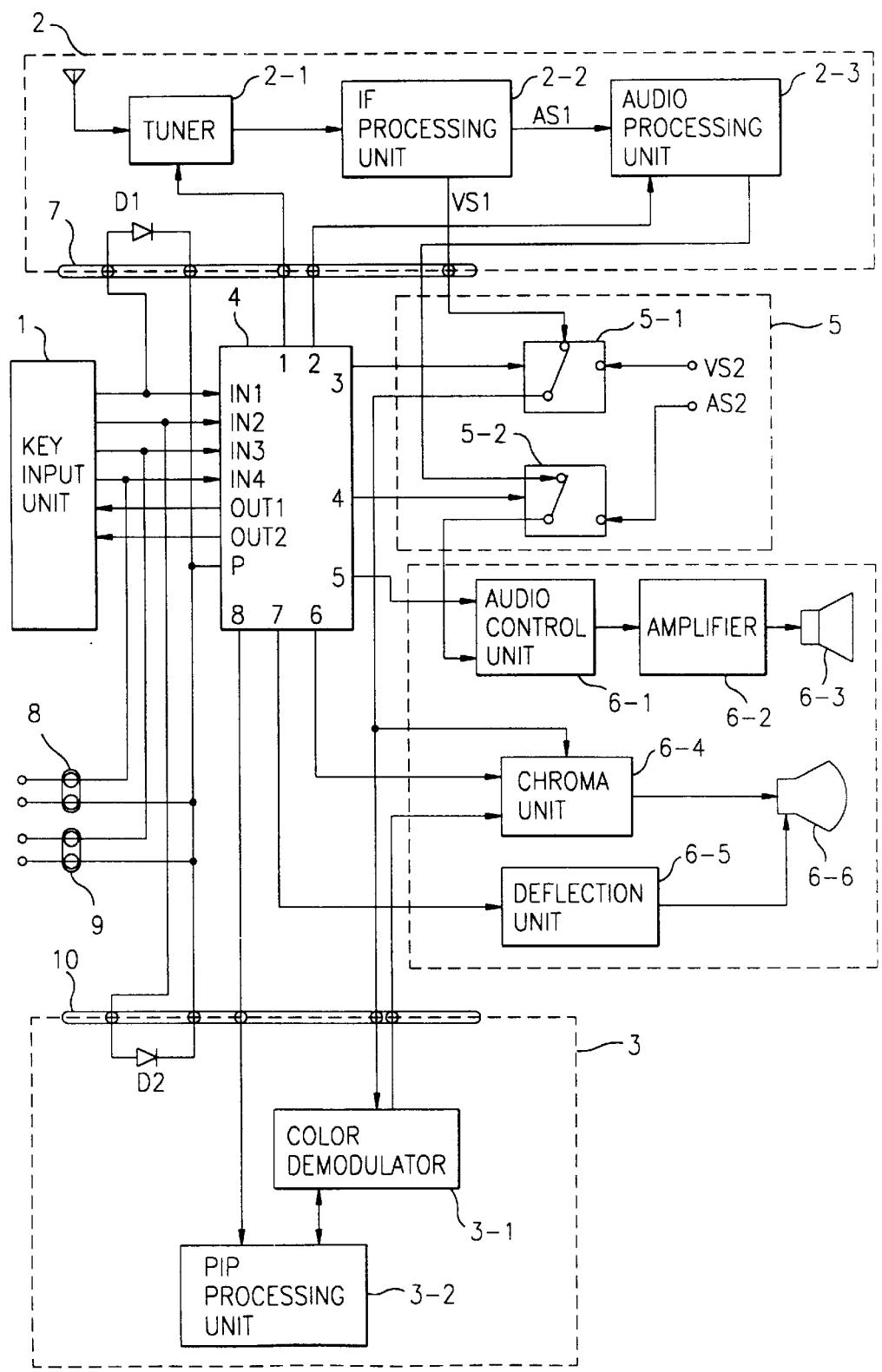
FIG. 1 is a block diagram illustrating a module TV according to a conventional art.
Figure 2A:
FIGS. 2A through 2C are timing diagrams with regard to signals outputted from a microcomputer in the circuit of FIG. 1.
Figure 2B:
Figure 2C:
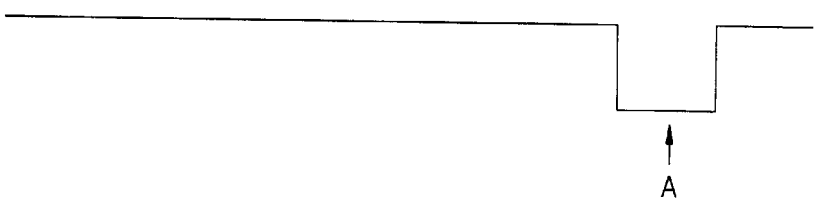
Figure 3:
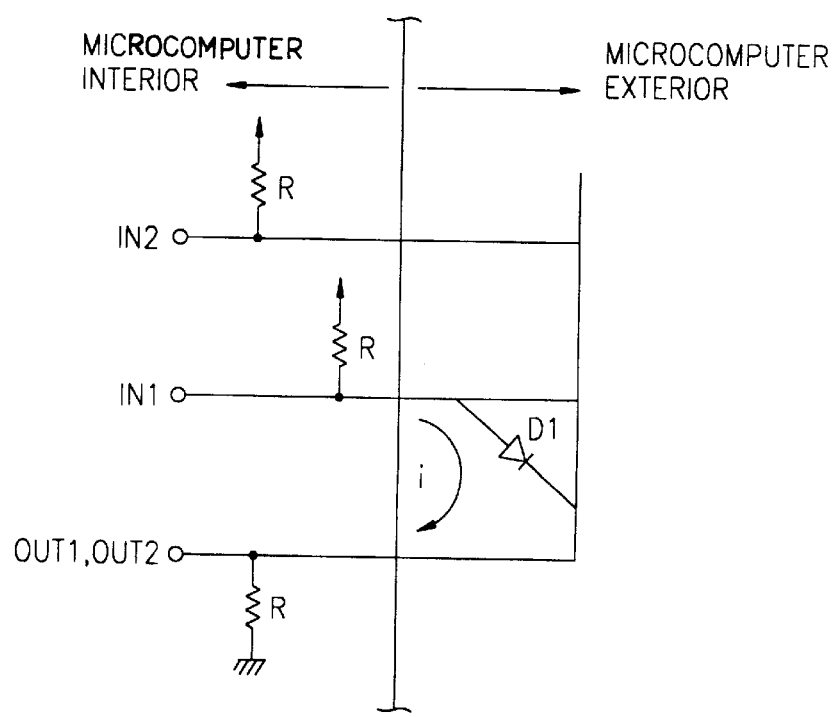
FIG. 3 is a view illustrating a current flow between the microcomputer and function cards during a card acknowledgement in the circuit of FIG. 1.
Figure 4:
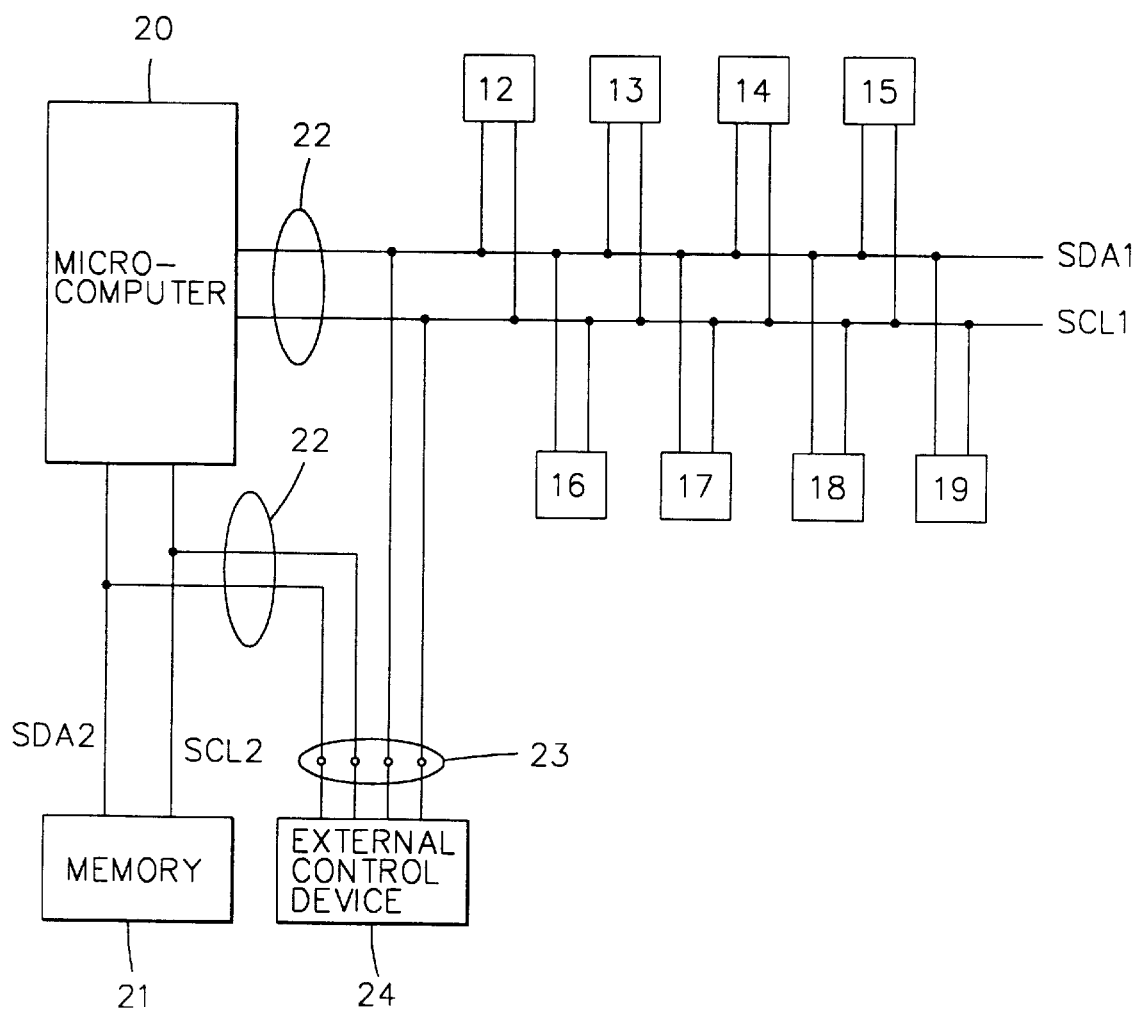
FIG. 4 is a block diagram illustrating a module TV according to the present invention.

As described in FIG. 4, the module TV according to the present invention includes: a plurality of function cards 12~19; a microcomputer 20 for carrying out a general control operation with regard to the module TV; a memory 21 for storing therein operational states of the module TV and the function cards 12~19; an $I^2C$ bus 22 for connecting the microcomputer 20 to the function cards 12~19 and the memory 21; and an external control device connection unit 23 for connecting the $I^2C$ bus 22 to an external control device 24.

Figure 5:
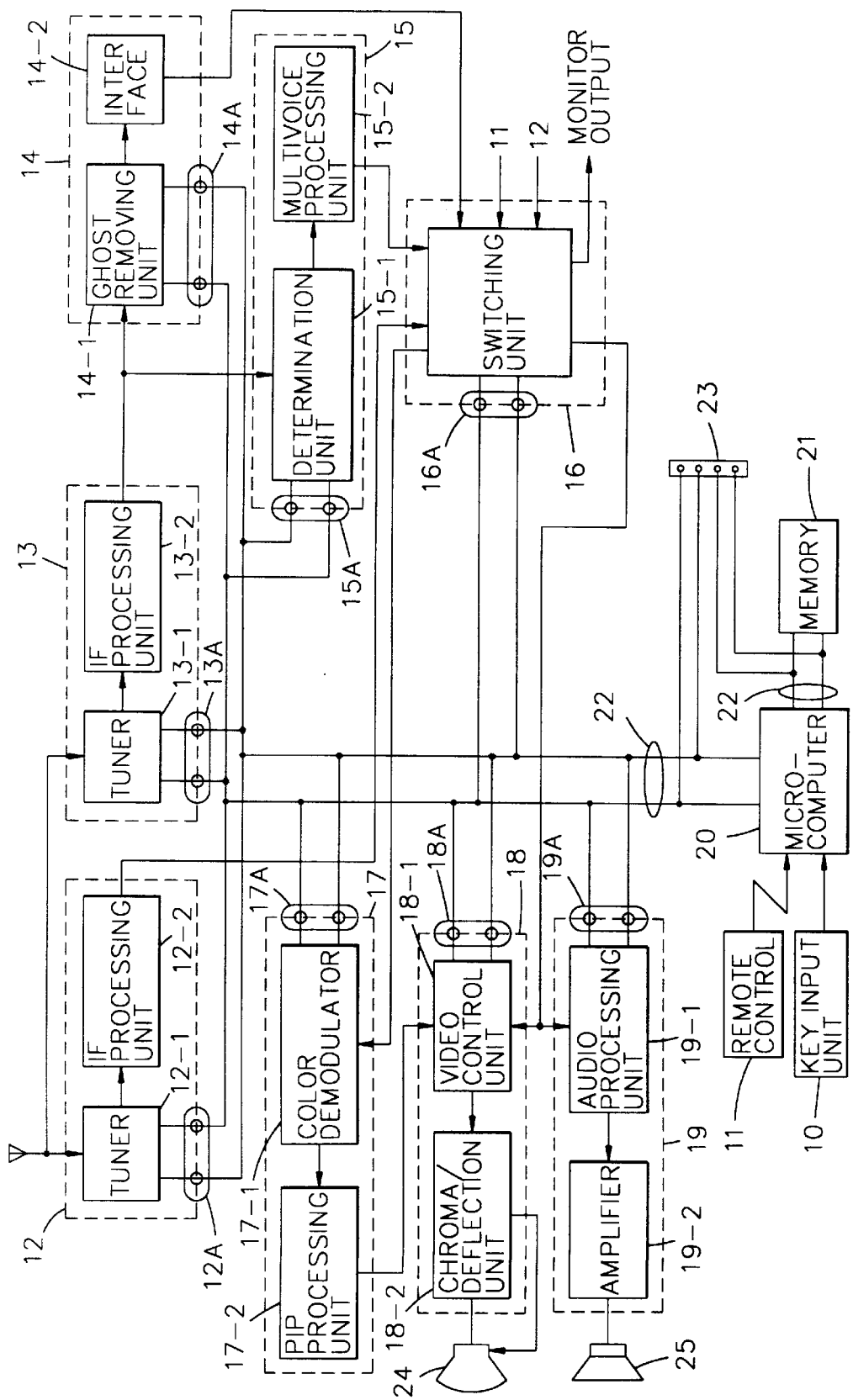
FIG. 5 is a block diagram detailing the composition in the circuit of FIG. 4.
Figure 6:
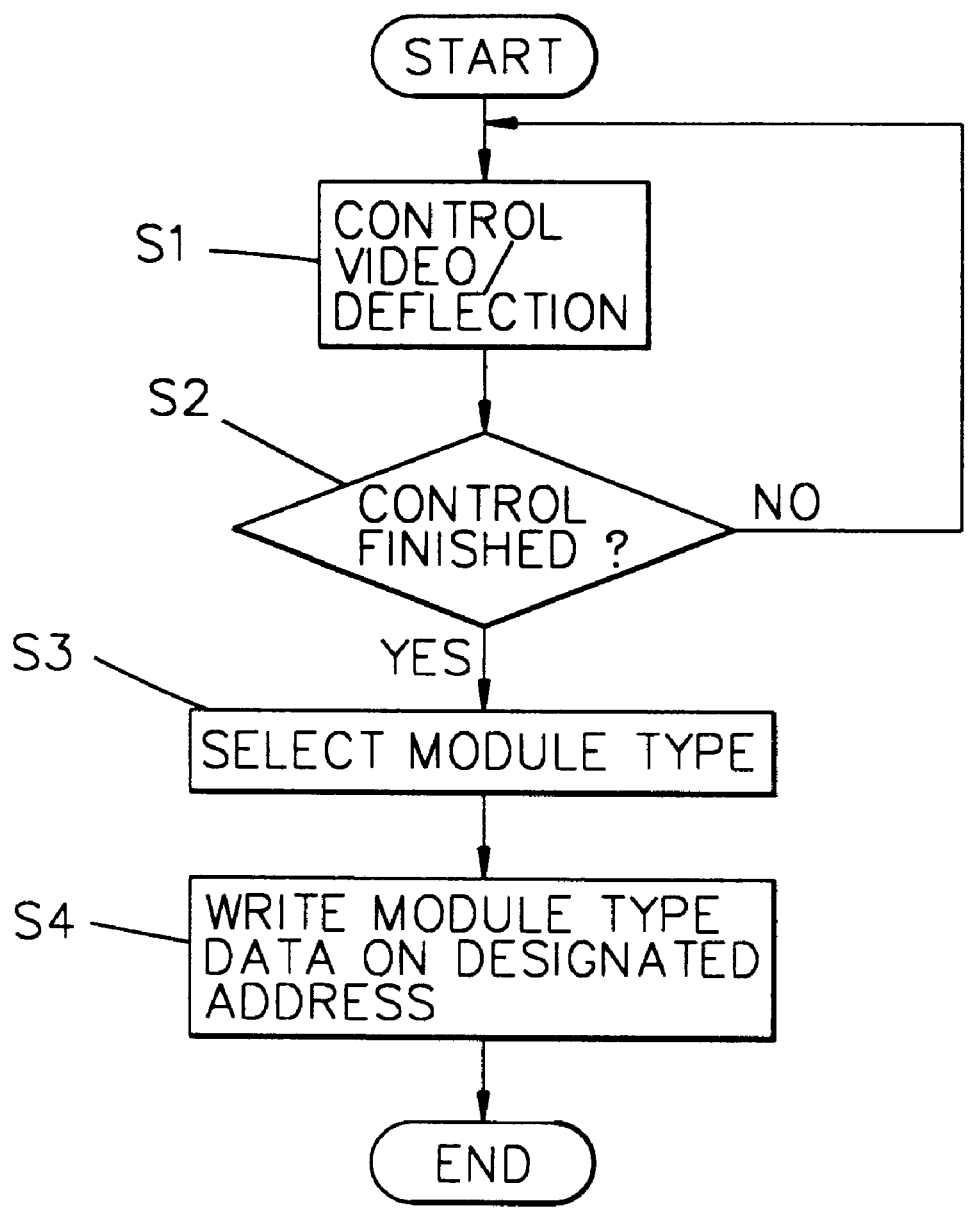
FIG. 6 is a flow chart illustrating a process in which module data are stored in a memory of the module TV through an external control device according to the present invention.
Figure 10:
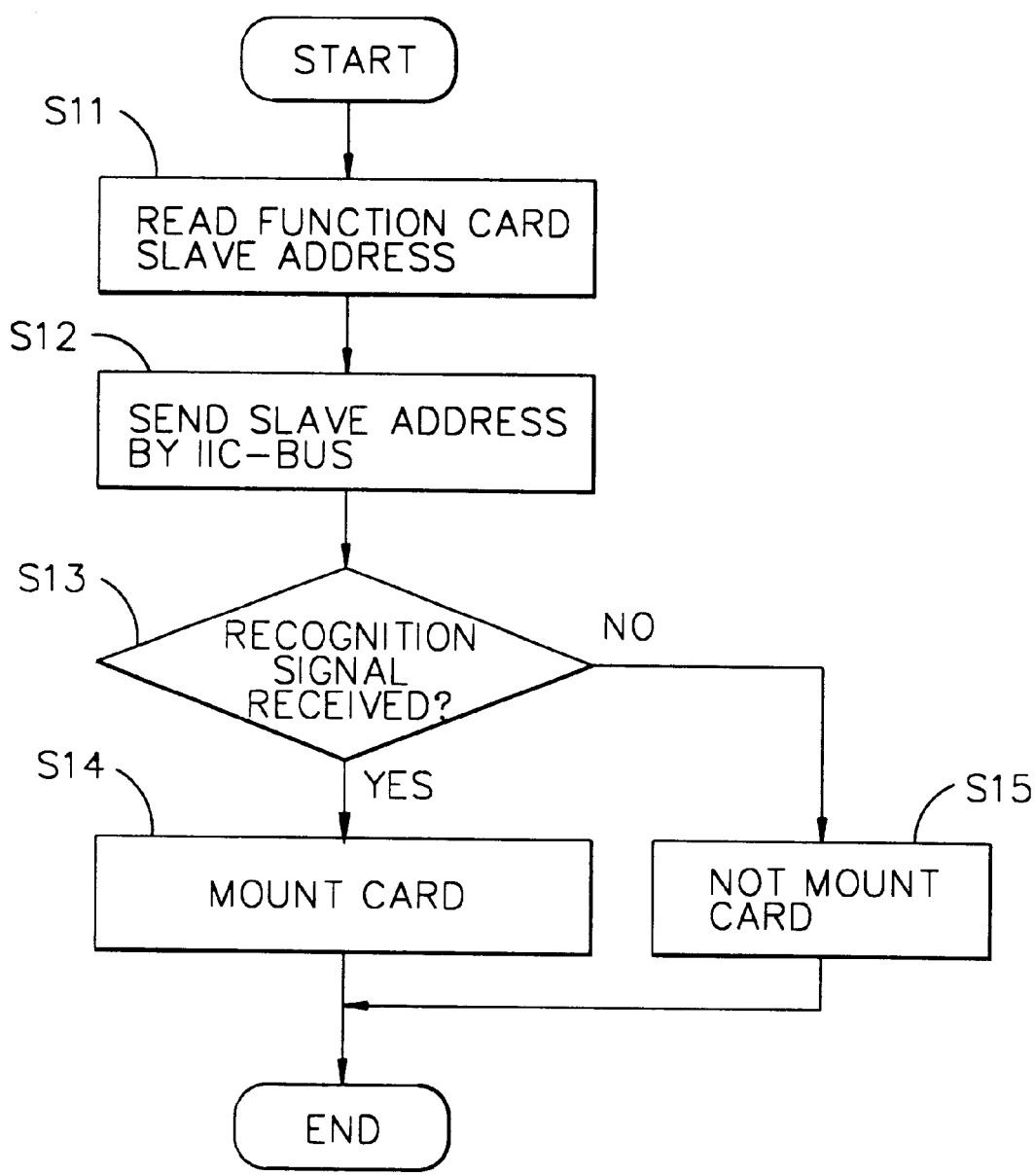
FIG. 10 is a flow chart for determining whether function cards are mounted, according to the present invention.

With reference to FIGS. 5 detailing the module TV in FIG. 4, the module TV further includes: a key input unit 10 provided with a plurality of function keys and a remote control 11; a plurality of function cards 12~19; a plurality of card connection units 12A~19A for electrically connecting the function cards 12~19 with an internal circuit in the module TV; the microcomputer 20 for carrying out a general control operation with regard to the module TV; the memory 21 for storing therein operational states of the module TV and the function cards 12~19; the $I^2C$ bus 22 for connecting the microcomputer 20 to the card connection units 12A~19A and the memory 21; and the external control device connection unit 23 for connecting the $I^2C$ bus 22 to the external control device 24.

Among the plurality of function cards 12-19, the main screen tuner and sub-screen tuner cards 12,13 correspondingly include: tuners 12-1, 13-1; and IF processing units 12-2, 13-2 for converting broadcast signals with regard to a channel selected in the tuners 12-1, 13-1. Therein, the ghost remove card 14 includes a ghost remove unit 14-1 for removing a ghost signal from the main screen, and an interface 14-2 for interfacing an output value from the ghost remove unit 14-1.

The multivoice card 15 includes a determination unit 15-1 for determining a broadcast signal of the main screen, and an multivoice processing unit 15-2 for multi-voicing the determined broadcast signal. The signal switching card 16 includes the main screen tuner card 12, the ghost control card 14, the multivoice card 15 and a switch for switching external video signals I1, I2.

The PIP card 17 includes a color demodulator 3-1 for demodulating a video signal outputted from the signal switching card 16, and the PIP processing unit 3-2 for PIP-processing the color-modulated video signal. The video control card 18 includes a video control unit 18-1 and chroma/deflection unit 18-2 for processing the video signals outputted from the signal switching card 16 and the PIP card 17 and outputting the resultant signals to the color receiving tube 24. The audio control card 19 includes the audio processing unit 19-1 and the amplifier 19-2 for processing the audio signal outputted from the signal switching processing unit 17 and outputting the resultant value to the speaker 25.

The thusly constituted module TV and control method thereof will now be described with reference to the accompanying drawings.

First, at an initial stage of the module TV production process, the external control device 24 connected to the memory 21 in the module TV through the external control device connection unit 23 and the I²C bus 22 carries out a video/deflection control through the external control device 24 (Step S1).

When the video/deflection control is completed (Step S2), the module type (O~D) as shown in FIG. 8 is selected. Then, after designating an address, the data of the selected module type is stored in the memory 21 (Steps S3–S4).

Therefore, the microcomputer 20 reads the module type data stored in the memory 21 and judges the respective module types, and then there are recognized kinds of function cards for being mounted with regard to the judged module types (Steps S5–S6 and S8). For example, when the module type data read from the memory 21 is "FF (hex)", the microcomputer 20 determines that it is a type 0 for a monitor exclusive TV (Step S7) and recognizes the PIP card 17, the video control card 18 and the audio control card 19 which are to be mounted in the type 0.

When the kinds of function cards 12~19 are recognized, the microcomputer 20 determines whether the recognized function cards are mounted, and the respective states are outputted on the main screen or on the monitor (Step S9–S10).

Figures 11, 12:
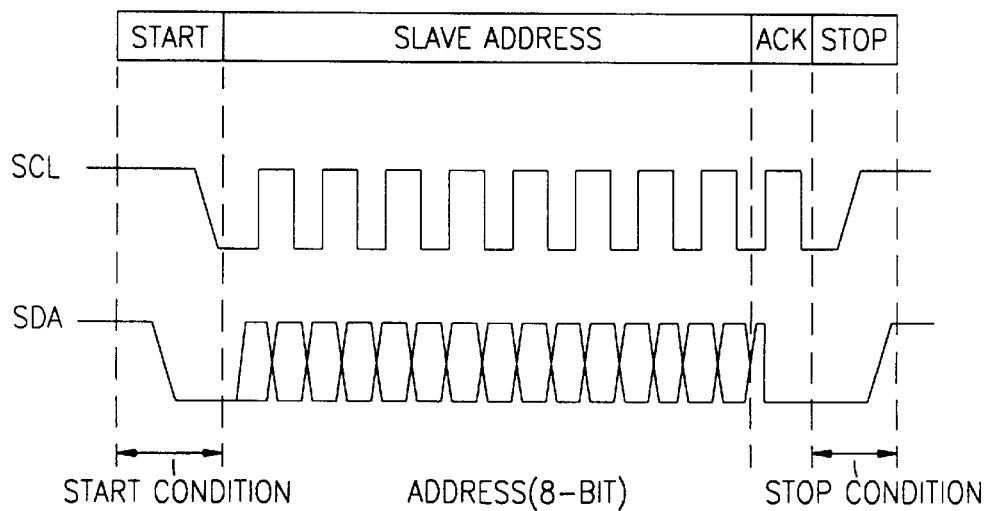
FIG. 11 is a table illustrating slave addresses with regard to the respective function cards according to the present invention.
FIG. 12 is a table illustrating acknowledgement signal wave forms of a regularized IIC bus according to the present invention.

That is, when the kinds of the function cards 12~19 are recognized, the microcomputer reads the slave addresses for the respective function cards 12~19 from the memory 21 as shown in FIG. 11, transmits the resultant values through the I²C bus 22 (Steps S11, S12), and checks whether an acknowledgement signal ACK is received from an IC for the I²C bus with regard to the function cards 12~19.

Then, in accordance with the control method of the I²C bus, when the slave clock signal SCL is transmitted from high to low level, the IC for the respective I²C buses begins its operation, so that by receiving the slave address signals (8-bit slave clock signal SCL and slave data signal SDA) outputted from the microcomputer 20, thereby outputting the slave data signal SDA in a low level when it corresponds to its own proper address, thereby transmitting a 1-bit acknowledgment signal ACK.

Therefore, the microcomputer 20 checks an acknowledgement bit of the slave data SDA transmitted from the IC for the respective I²C buses, and when the acknowledgement bit is in a low level, it is determined that a function card is mounted; when the acknowledgement bit is in a high level, it is determined that a function card is not mounted (Steps S13–S15).

Likewise, when the mounting of all the function cards for being mounted in accordance with the module data is completed, the module data are performed, and when the mounting of the function cards is not completed, there is displayed a confirmation message of the function cards mounted along with data including kinds and states of the function cards depending upon module types on the main screen or the monitor.

Figure 14:
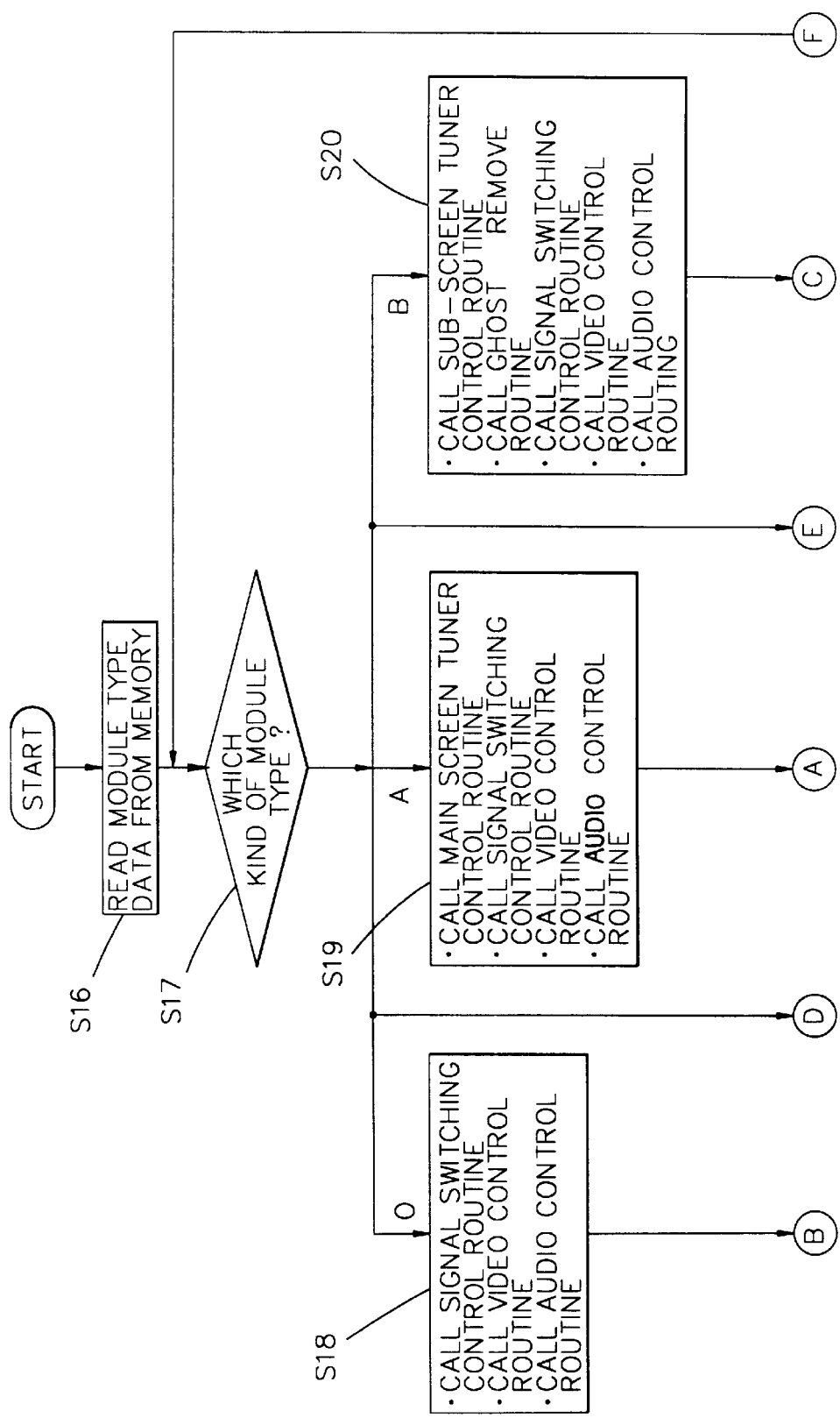
FIG. 14 is a flow chart illustrating control routine steps with regard to the respective module types according to the present invention.

Then, when a user's confirmation with regard to the non-mounted function cards is completed, the module data are performed as shown in FIG. 14.

That is, when the card acknowledgement steps are finished, the microcomputer 20 reads data with regard to module types from the memory 21, determines which type the read modules are (Steps S16, S17), and carries out a sub-routine with regard to the determined module type.

For example, when the read module type is type D incorporating the PIP and multivoice TV, the microcomputer 20 sequentially calls sub-routines such as a main screen tuner control routine, a sub-screen tuner control routine, a multivoice control routine, a signal switching control routine, a PIP control routine, a video control routine, and an audio control routine, for thereby respectively controlling the main screen tuner card 12, the sub-screen tuner card 13, the multivoice card 14, the signal switching card 16, the PIP card 17, the video control card 18, and the audio control card 19 (Step S22).

The respective steps (S18–S21) are applicable to each of the module types 0~C.

At this time, the microcomputer 20 carries out a key control routine (Step S23), and when a power off key is inputted, the key control routine is finished; when the power off key is not inputted, the key sub-routine is carried out and then the steps after the step S17 are repeated (Steps S24, S25).

As a result, the video data with regard to the respective module types are displayed through the color receiving tube 24, and the audio data with regard to the video data are outputted through the speaker 25.

As described above, because the module TV according to the present invention selects a module type requested by a customer at an initial stage during the module TV production, a variety of module TVs respectively having a plurality of functions may be produced.

Further, the module TV according to the present invention employs the I²C bus and accordingly jointly uses two lines with regard to the connection line number regardless of the number of the function modules, thereby improving design efficiency.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A modular TV control method, comprising:
    storing data of a module type having designated address in a memory after designating an address on the module type selected by the customer;
    certifying the module type data stored in the memory by using a microcomputer in order to install a function card corresponding to the module type selected by the customer; and carrying out predetermined control routines to produce a modular TV in accordance with the stored data when installation of the function card corresponding to the module type selected by the customer is certified.

2. The method of claim 1, wherein said storing data further comprises:

connecting external control units to the modular TV using a connection part of the external control units in a primary production process; and storing the data of the predetermined module types to an address of the memory corresponding to each of the predetermined types through a control bus connected to the external control units as the connection of the control units is completed.

3. The method of claim 1, wherein said certifying the data further comprises:

reading through a microcomputer the data stored in the memory by an external unit and recognizing each of the predetermined module types according to the stored module type data;

selecting respective function cards mounted according to each of the predetermined module types as the module types are recognized;

transmitting over an I$^2$C bus a predetermined confirm signal from the microcomputer to each function card as the function card is being selected and judging whether a recognition signal from each function card is received; and judging whether the function card is mounted according to the reception of the recognition signal.

4. The method of claim 1, wherein said carrying out control routines further comprises:

reading the data of the predetermined module type stored in the memory;

carrying out sub-routines controlled according to the thus read predetermined module type; and carrying out a key control routine which terminates the control routines if a power-off signal is inputted, and which repeats, via a key subroutine, said carrying out sub-routines and said carrying out the key control routine if a power-off signal is not inputted.

* * * * *